Oct. 10, 1950 — Z. S. BEIJL — 2,525,198

BOLT ANCHOR

Filed May 12, 1947

Inventor
Zako Sytse Beijl
By his attorneys,
Baldwin & Wight

Patented Oct. 10, 1950

2,525,198

UNITED STATES PATENT OFFICE 2,525,198

BOLT ANCHOR

Zako Sytse Beijl, London, England

Application May 12, 1947, Serial No. 747,406
In Great Britain February 28, 1947

4 Claims. (Cl. 85—2.8)

1

The invention relates to bolt anchors such as are used for fixing bolts in holes drilled or otherwise made in hard substances. It is intended mainly for bolts such as are used for securing the roofs of mines or other underground workings in accordance with my U. S. Patent No. 2,398,130 or for reinforcing the surrounding rock when tunnelling in accordance with my co-pending patent application No. 686,075 filed July 25, 1946, now Patent 2,442,113, but it is not limited to these two purposes.

A well known form of bolt anchor comprises shield segments surrounding the bolt and a tapered member by which the segments are expanded when the bolt is screwed up, but the segments were secured together at one end, so that only the other end expanded and gripped the wall of the hole. This form of grip was not always satisfactory in rock formations because of the considerable clearance required to compensate for any relief movement of the walls of the hole before the insertion of the bolt. In an adaptation of this form of bolt anchor which I have disclosed in the above-mentioned patent the segments were not secured together at the end, but had to be supported by washers and springs against the thrust exerted by the tapered member at the other end. A left-handed thread was required on the bolt in that case to ensure the expansion of the shield segments at both ends of the bolt.

It is an object of the invention to provide an improved anchoring construction including an anchor which will expand evenly over its whole length and thus provide a more secure grip in the hole in which it is placed.

It is another object of the invention to provide such a construction in which the anchor is expanded by tapered members from both ends concurrently.

It is a further object of the invention to provide a bolt with anchors at both ends in which washers and springs for supporting the anchors are not required and in which left-handed screw threads are unnecessary.

Figure 1:
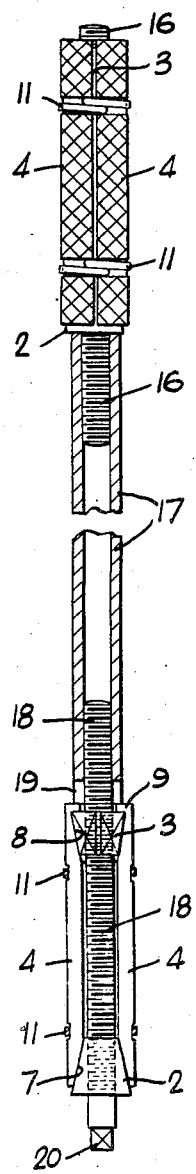
Figure 2:
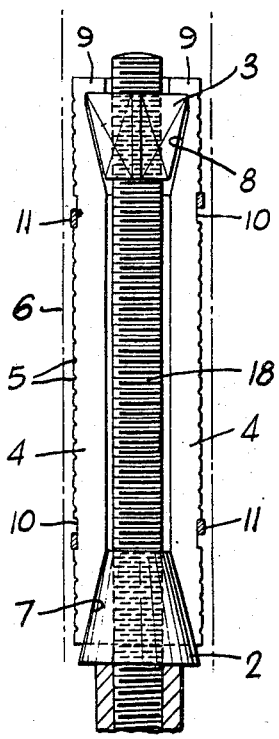
Figure 3:
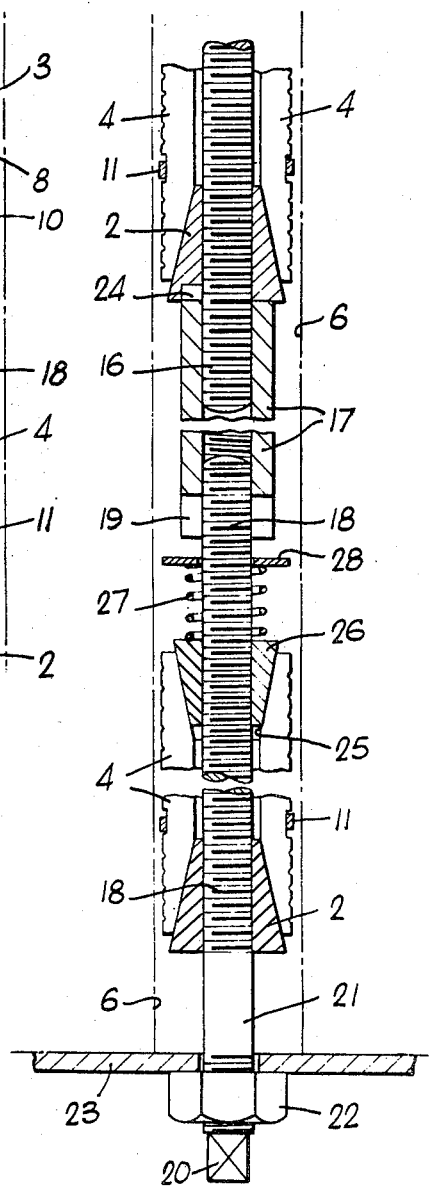

With these objects in view the invention is illustrated by constructional forms shown in the accompanying drawings, in which:

Figure 1 is part elevation and part section of a bolt with two anchors according to the invention, Figure 2 is an enlarged sectional view of the upper part of Figure 1, and Figure 3 is a view corresponding to Figure 1

2 but partly broken away to show some modifications.

Throughout the description the bolt will be assumed to be inserted in the hole vertically upwards, but this is merely with the object of facilitating the description. In actual practice the bolt may have to be inserted in any direction.

Referring first to Figure 1, the apparatus comprises an upper or first bolt 16, a tubular part or member 17 and a lower or second bolt 18 normally joined together by external screw threads on the bolts and internal screw threads at both ends of the tubular member 17. The wall thickness of the tubular member is such that it has at least the same strength in tension as the bolts 16 and 18. The lower end of the member 17 is formed with claws at 19 like those of a claw clutch, which can be engaged by a suitable tool before the bolt 18 is screwed into the member 17. Both bolts are provided with anchors for holding them in place as will now be described. Figure 2 shows the anchors and related parts for the bolt 16 in greater detail.

The bolt 16 is threaded throughout its length, while on the bolt 18 the thread terminates short of the lower end. On each bolt a conical nut 2 is screwed on to the bolt apex upwards. The nut 2 on the bolt 16 is screwed to abut against the upper end of the tubular member 17, while that on the bolt 18 is screwed to the end of the thread. Alternatively the nut 2 may be welded or otherwise made fast to the bolt. A second nut 3 of pyramidal form is screwed on to the top end of the bolt apex downwards. An anchor comprises four segments 4, 4 together forming a diametrically expansible approximately cylindrical shield or sleeve with external helical grooves 5, 5 crossing each other or other form of roughness to provide adequate gripping in the hole denoted by chain dotted lines 6, 6 in Figure 2.

Each segment 4 has near its lower end an internal conical surface 7 tapering inwardly toward the longitudinal center and the axis of the sleeve to fit the complementarily shaped outer surface of the conical nut 2 and near its upper end a tapered or sloping flat internal surface 8 to fit one complementarily shaped outer surface or face of the pyramidal nut 3. Between the surfaces 7 and 8 the inner face of each segment 4 is cylindrical to fit the bolt 1 when the segments are not expanded. Lips 9, 9 at the upper end of each segment project over the end of the nut 3 to hold the anchor in place when inserting or removing the bolt with the anchor.

A flat circumferential groove 10 is provided near each end of the anchor to accommodate a ring spring 11, which normally holds the segments 4, 4 together on the bolt 1.

The lower bolt 18 terminates in a square head 20 by which it may be turned.

To use the bolt for reinforcing an exposed surface underground, the bolt 16 and tubular member 17 are firmly screwed together, and the anchor is assembled with its nuts on the bolt 16, the nut 2 being firmly screwed against the top of the tubular member 17. The conical nut 2 is preferably greased on its outer surface. The assembly is inserted in the elongated cavity or hole 6, and the assembly 16 and 17 is then turned in a right-handed direction by means engaging the claws 19. The segments 4, 4 are prevented from turning by friction against the sides or walls of the hole 6, and the pyramidal nut 3 is held from rotating by the flat surfaces 8, 8, whereby the nut 3 is moved downwards. The conical nut 2 turns with the assembly 16 and 17, due to its abutting against the end of the tubular member 17 or being otherwise fixed.

The movement of the nuts 2 and 3 towards each other expands the shield segments 4, 4 because of their tapered inner surfaces 7 and 8. Since the segments are forced outwards from both ends, the bolt 16 takes up a longitudinal position in which the outward pressure exerted by the shield is approximately balanced as between the upper and lower ends. The grip thereby exerted is substantially uniform over the whole length of the anchor. The inward pressure exerted by the ring springs 11, 11 is negligible in comparison with the outward pressure due to the screwing up of the bolt.

After the fixing of the bolt 16 and member 17 already mentioned, the bolt 18 with its anchor in place is inserted and screwed up. The operation of screwing up has two effects. Firstly the upper end of the bolt 18 enters the member 17 and is screwed into it, and secondly the lower anchor is expanded to grip the walls of the hole, the gripping force and the tension in the complete bolt increasing concurrently.

The form of bolt just described is intended for permanent installation in a tunnel or other large cavity underground, but some modifications may be required in certain cases. If it is desired to add a lining to the cavity, the lower end may be threaded as shown in Figure 3, but a portion of the bolt 18 should be left unthreaded at 21 to provide for location of the lower conical nut 2. A nut 22 holds the lining 23 in place.

Another modification is shown in Figure 3 for the case in which it is desired to recover the reinforcement and use it again elsewhere. The upper conical nut 2 has a notch engaged by a projection 24 on the upper end of the tubular part 17. The fixing of the upper part of the complete bolt assembly is effected in the same manner as previously described. For removal, the lower bolt 18 is first unscrewed. It is thereby detached from the tubular member 17, and the springs 11, 11 cause the segments to collapse into contact with the bolt 18, which can then be removed with the lower anchor. The tubular member 17 is then unscrewed by means of the claws 19, the projection 24 ensuring the unscrewing of the conical nut 2, so that the segments 4 are released from both ends and are caused to collapse by their springs 11. The bolt 16 and member 17 with the upper anchor can then be pulled out of the hole.

A further modification which may be suitable in certain cases is also shown in Figure 3. This relates to the outer bolt 18. The upper ends of the segments 4, 4 have conical internal surfaces 25 to engage a conical bush 26 capable of sliding on the bolt portion 18. A coil spring 27 with washer 28 is interposed between the upper end of the bush 26 and the lower end of tubular portion 17. The lips 9 of Figure 2 are omitted in this case.

After the upper anchor and the bolt 16 and member 17 have been fixed as previously described, the bolt 18 has the anchor assembled on it with the nut 2, bush 26, spring 27 and washer 28, and the nut 2 should be at the lower end of the bolt thread. The bolt is then screwed up by means of the square end 20. The length of the spring may be initially about 40 to 50 mm. and the free upper end of the bolt 18 about 25 mm. beyond the washer 28.

The first effect of screwing the bolt 18 is to screw it into the member 17 and to rotate the anchor with it. When the bolt 18 has well entered the member, the spring 27 bears against the lower end of the member 17. Further screwing up of the bolt 18 compresses the spring 27 until it is fully collapsed, and the shortening distance between the nut 2 and the bush 26 expands the segments 4, 4 from both ends against the walls of the hole.

The external finish of the segments need not necessarily take the form of grooves 5, but in any case the roughness of the finish will be made suitable for the kind of formation in which the bolts are to be fitted.

Where a bolt is to be permanently fixed and not recovered, it may be desirable to grout the hole with cement after the bolt has been finally tightened up.

What I claim is:

1. Apparatus for clamping together the formation surrounding an elongated cavity comprising a first screw threaded bolt; a second screw threaded bolt; a tubular member screw threaded internally at its opposite ends and having threaded connection respectively with said bolts; a first anchor device comprising a diametrically expansible sleeve having at each end an internal surface tapering inwardly from the adjacent sleeve end toward the longitudinal center and the axis of the sleeve, a relatively fixed nut screwed on said first bolt and abutting the adjacent end of said tubular member and having an outer surface complementary to the adjacent inwardly tapered surface of said sleeve, and an axially movable nut screwed on said first bolt and having an outer surface complementary to the other inwardly tapered surface of said sleeve; rotation of said tubular member and said relatively fixed nut and said first bolt together effecting relative approaching movement of said nuts along the sleeve axis to thereby expand said sleeve and cause it to grip against the walls of said cavity; and a second anchor device comprising a diametrically expansible second sleeve having at each end an internal surface tapering inwardly from the adjacent sleeve end toward the longitudinal center and the axis of the second sleeve, a nut fast on said second bolt and having an outer surface complementary to one inwardly tapered surface of said second sleeve, and an axially movable nut screwed on said second bolt and having an outer surface complementary to the other inwardly tapered surface of said second sleeve, rotation of said second bolt and the nut fast thereon effecting relative approaching movement of the nuts of said second anchor device along the second sleeve axis to thereby expand said second sleeve and cause it to grip against the walls of said cavity, and simultaneously causing said second anchor device to move bodily relatively toward said first anchor device for clamping together the formation surrounding said cavity.

2. Apparatus as set forth in claim 1 in which the sleeve of each anchor device comprises four longitudinally divided segments, and a yieldable ring spring surrounding said segments and resiliently urging them into engagement with the associated nuts.

3. Apparatus as set forth in claim 1 including axially separable means connecting the relatively fixed nut of the first anchor device with the abutting end of the tubular member for enabling said nut to be turned on said first screw by rotation of said tubular member reversely to the direction in which it is turned when effecting relative approaching movement of the nuts of said first anchor device.

4. Apparatus as set forth in claim 1 including a compression spring interposed between the end of said tubular member adjacent said second anchor device and the axially movable nut of said second anchor device.

ZAKO SYTSE BEIJL.

REFERENCES CITED

The following references are of record in the file of this patent:

UNITED STATES PATENTS

| Number | Name | Date |
|---|---|---|
| 527,406 | Church | Oct. 16, 1894 |
| 570,786 | Church | Nov. 3, 1896 |
| 719,426 | Boone | Feb. 3, 1903 |
| 1,120,368 | Booraem et al. | Dec. 8, 1914 |